June 11, 1929.  L. W. BOND  1,717,307
ELECTRIC SWITCH
Filed Sept. 10, 1926   2 Sheets-Sheet 1
Fig. 1.
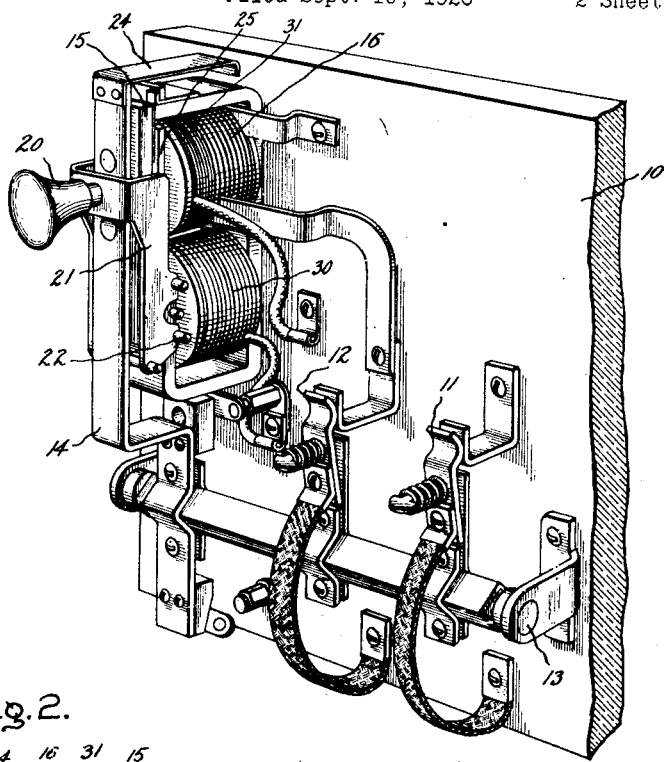
Fig. 2.
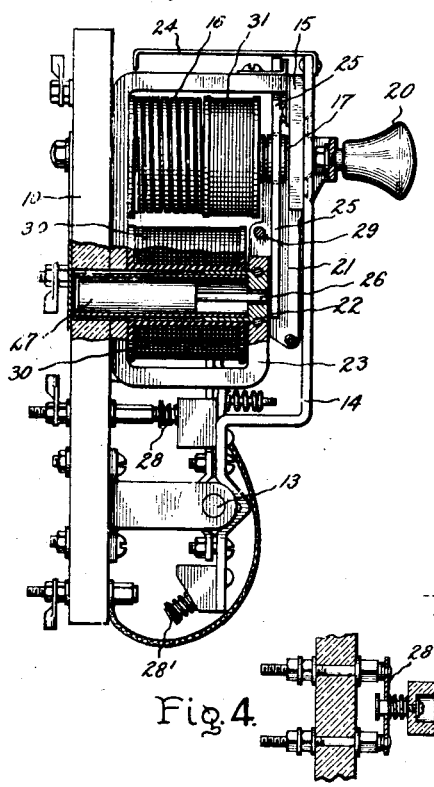
Fig. 3.
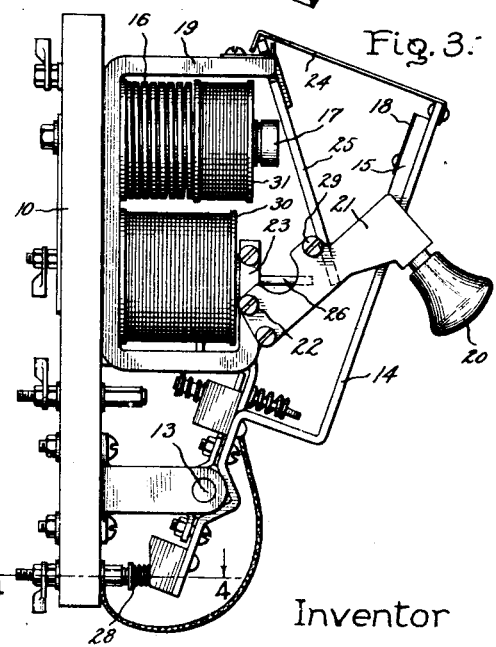
Fig. 4.
Inventor
Leslie W. Bond,
by
His Attorney.

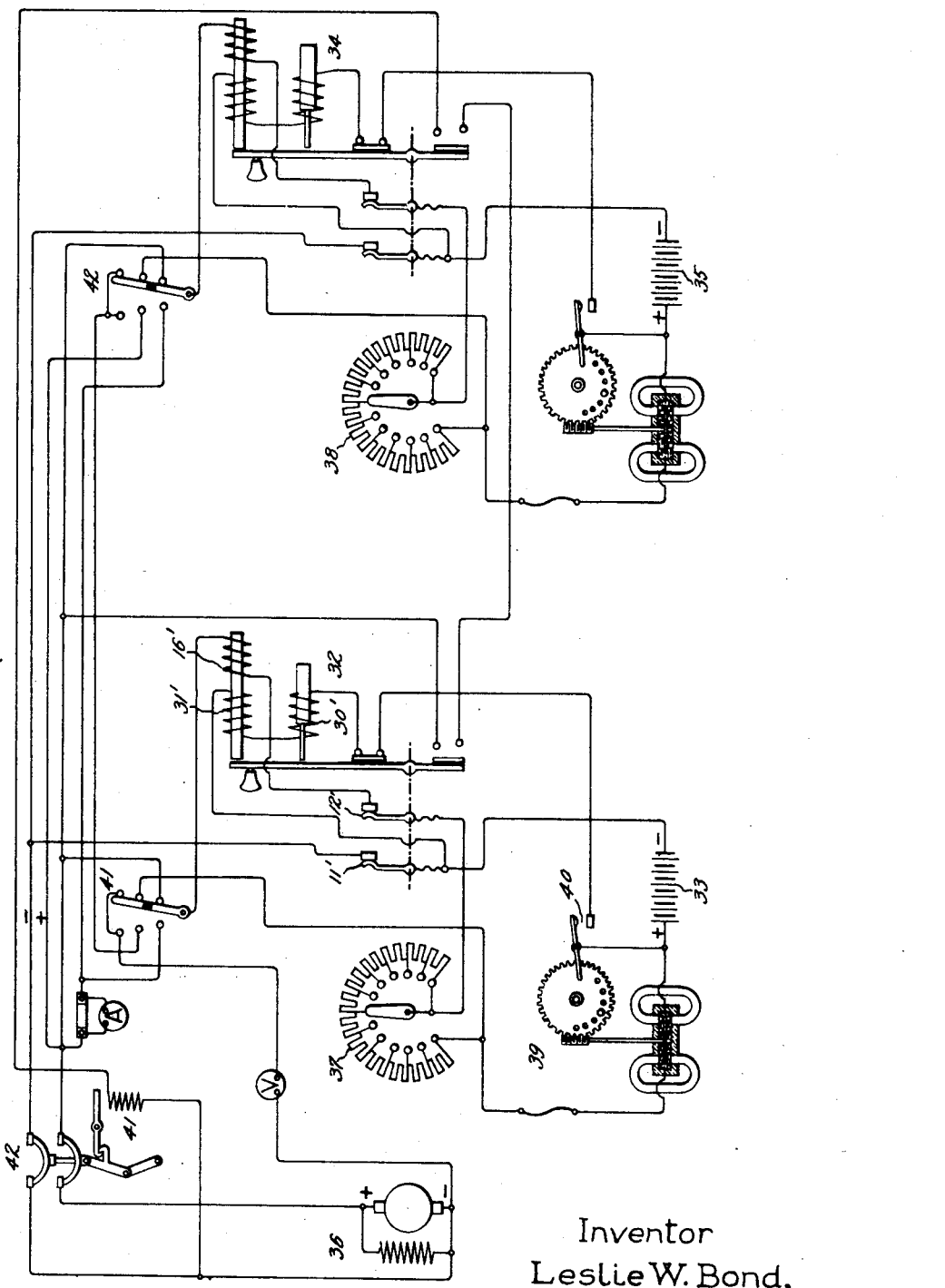
June 11, 1929.  L. W. BOND  1,717,307
ELECTRIC SWITCH
Filed Sept. 10, 1926    2 Sheets-Sheet 2
Inventor
Leslie W. Bond,
by
His Attorney.

Patented June 11, 1929.

1,717,307

UNITED STATES PATENT OFFICE.

LESLIE W. BOND, OF SCHENECTADY, NEW YORK, ASSIGNOR TO GENERAL ELECTRIC COMPANY, A CORPORATION OF NEW YORK.

ELECTRIC SWITCH.

Application filed September 10, 1926. Serial No. 134,736.

My invention is directed to improvements in electric switches and although the invention is not necessarily limited thereto, it has a particular application in systems for charging batteries. The invention meets succesfully the following conditions which are encountered in battery charging systems.

The switch controlling the connection between the battery and the source of supply should be able to be closed manually and be opened either manually or electrically in order that the operator may have full control of the system when he desires and in order that the battery may be automatically disconnected from the source either when the charging current is less than a predetermined value or when the battery is fully charged. It is desirable that the switch be held closed by an electromagnet energized responsively to the charging current, and in order to meet the practical conditions, no triggers, latches or the like should be used to hold the switch closed since these devices are inherently slow acting and at best are unreliable. The quick opening of the switch electrically either when the charging current is reduced below a predetermined value or when the battery is fully charged can not be effected electrically under the stated conditions by neutralizing the flux of the series holding electromagnet since this flux varies as the charging current varies and if the neutralizing flux were of such a value as to neutralize the holding flux set-up for a high value of charging current, it would be sufficient to set up a holding flux which would keep the switch from opening when the charging current is low.

The invention will be understood from a consideration of the following description taken in connection with the accompanying drawings. Referring to the drawings, Fig. 1 shows a perspective view of a switch in accordance with the invention; Fig. 2 is a side view of the switch showing the electromagnet provided for effecting the electrical release of the switch shown in part section for the purpose of explaining the mode of operation of the switch; Figs. 1 and 2 show the switch with the various parts thereof in the closed position of the main contacts of the switch; Fig. 3 is a side view of the switch showing the positions of the various parts of the switch in their respective positions when the main contacts of the switch are in their open position; Fig. 4 is a detail of a normally closed auxiliary switch mechanism associated with the main contact switch mechanism for a purpose which will hereinafter be explained, and Fig. 5 is a very simplified diagram of a battery charging system in which the switches in accordance with the present invention are utilized for controlling the connection and disconnection of a battery from a charging generator.

Referring to Figs. 1 to 4 inclusive, it will be seen that the various parts of the switch are mounted on an insulated supporting base 10 and that the movable main contacts 11 and 12 are mounted upon and insulated from a shaft 13 supported in suitable brackets as shown. These main contacts cooperate with stationary contacts to establish a charging circuit for the battery. The operating mechanism for the contacts 11 and 12 comprises an operating member 14 which is secured to and insulated from the shaft 13. This member 14 carries at its upper end a magnetic movable member or armature 15 of the holding electromagnet 16. This holding electromagnet is provided with a series coil wound about the core 17 of the magnetic structure. The armature 15 is mounted so as to almost make engagement with the projecting end of this core when the switch is in the closed position as indicated in Figs. 1 and 2, although it is not absolutely necessary that there be an air gap at this point. The shim 18 of non-magnetic material is carried by the armature 15 so as to provide a small air gap between the upper leg 19 of the magnetic structure associated with the holding electromagnet. The manual operating means of the switch comprises a handle 20 and a channel-shaped member 21 to which the handle 20 is connected and which is pivotally mounted at 22 in the lower leg 23 of the magnetic structure. The stop 24 of non-magentic material is provided for arresting the opening movement of the operating member 14, as is indicated in Fig. 3.

A lever 25 of non-magnetic material is fulcrumed in the end of the upper leg 19 of the magnetic structure of the holding electromagnet, and as indicated in Fig. 2 this lever is provided with an aperture through which the protruding end of the core 17 projects when the main switch contacts are in the closed position. The channel-shaped member 21 of the manual operating means is adapted to embrace the operating member 14 so that with the main contacts of the switch in the open position (Fig. 3), by turning the operating means about its pivot 22, the operating member 14 (Fig. 3) is rotated counter-clockwise about the pivot provided by the shaft 13 until the shim 18 secured to the armature 15 makes engagement with the right-hand end of the leg 19 of the magnetic structure of the holding electromagnet. This movement will also permit the lever 25 to move clockwise about its pivotal support and be brought to the position shown in Figs. 1 and 2. The pin 26 of non-magnetic material which projects from the plunger 27 of the releasing electromagnet will be engaged by the lower end of the lever 25 and the plunger 27 will be moved to the position indicated in Fig. 2. The upper auxiliary switch mechanism 28 associated with the operating member 14 will be moved to the closed position as indicated in Figs. 1 and 2 and the lower auxiliary switch mechanism 28' will be moved to the open position as is also indicated in Figs. 1 and 2 by the closing movement of handle 20.

With the parts in their various positions as indicated in Figs. 1 and 2, the channel-shaped member 21 of the operating means will be magnetically held in its position corresponding to the closed position of the main contacts of the switch by the flux set-up by the series winding of the holding electromagnet 16. The armature 15 will also be magnetically held in its attracted position by the flux of the holding electromagnet and the main switch contacts 11 and 12 will be magnetically held in their closed position. In order to manually open the switch, the handle 20 is pulled down, thereby bringing the pin 29 carried by the member 21 into engagement with the lower end of the lever 25, thus forcing the armature 15 out of its attracted position against the pull of the holding electromagnet. When the armature 15 has been separated a predetermined distance from the core 17, the switch will open very quickly by reason of the fact that the air gap introduced between the armature 15 and core 17 will be such that the magnetic holding effect of the holding electromagnet will be very materially reduced. As soon as the main contact 12 interrupts the circuit controlled thereby, the series electromagnet 16 will be deenergized since the winding of this electromagnet is in series relation with the contact 12.

With the main contacts of the switch in their closed positions as indicated in Figs. 1 and 2, the switch may be opened electrically by energizing the winding 30 of the releasing electromagnet. Referring to Fig. 2, it will be seen that the energizing of this winding will cause the plunger 27 to move toward the right thereby causing the pin 26 to press outwardly on the lower end of lever 25. This will effect a separation of the armature 18 from the pole 17 and cause the switch to be opened. By reason of the fact that the channel-shaped member 21 of the operating means and the plunger 27 of the releasing electromagnet act through the lever 25, a relatively small opening force is required to effect the opening of the main contacts of the switch.

It will be observed that no triggers, latches or the like are utilized in holding the switch closed, and it will also be observed that the winding 30 of the releasing electromagnet may be designed to set up such a magnetic force as to always overcome the holding pull of the holding electromagnet 16. In order to insure a certainty of action under all conditions, I have provided the neutralizing winding 31 which is preferably connected in series relation with the winding of the releasing electromagnet 30, this neutralizing winding being disposed on the core 17 and arranged to set up a flux always in the opposite direction to the flux set up by the series or holding electromagnet. Thus, by reducing the holding effect of the retaining electromagnet and by means of the releasing electromagnet applying an opening force to the lower end of the lever 25, I am able to obtain a quick electrical release of the main contacts so that these contacts may return to their biased or normal open position.

By referring to Fig. 5, it will be seen that the switch 32 is indicated diagrammatically as of the same type as the switches shown in more detail in Figs. 1 to 4 inclusive, and that this switch controls the charging circuit for the battery 33. It will also be seen that the similar switch 34 controls the charging circuit for the battery 35. These batteries are arranged to be charged from the charging generator 36 through the system indicated. The rheostat 37 is included in the charging circuit of the battery 33 and the rheostat 38 included in the charging circuit of battery 35. The ampere hour meter 39 is included in the circuit with battery 33 so as to automatically close its contacts 40 when the battery has been fully charged. The closing of these contacts 40 will energize the releasing electromagnet 30' and the neutralizing winding 31' of switch 32. This will effect the automatic release of the main contacts 12' and 11' and disconnect the battery 33 from the charging generator 32. The operation of the switch 34 in the control of battery 35 is the same as the operation of switch 32 in the control of battery 33. When both the switches 32 and 34 have been opened either manually or electrically the lower auxiliary contact mechanism associated therewith will close and energize the circuit of the releasing electromagnet 41 of the main switch 42 included in the charging circuit between the generator 36 and the batteries 33 and 35. With the switch 32 in its closed position as indicated, when the charging circuit of the battery 33 drops below a predetermined value, the winding of the holding electromagnet 16' will be insufficient to retain the main contacts of the switch 32 in their closed positions so that the automatic disconnection of the battery 33 from the generator 36 will occur under these conditions. As explained in connection with Figs. 1 to 4 inclusive, the switch 32 may be closed manually or either opened manually at the will of the operator or opened electrically by the releasing electromagnet when the electromgnet is energized as previously explained in connection with Fig. 5. The switches 41 and 42 are provided for obtaining voltage readings on the batteries 33 and 35 and are also provided for obtaining a selective charging of these batteries.

A detailed description of the system of Fig. 5 is believed to be unnecessary since this showing of a system is merely for the purpose of indicating generally, to those skilled in the art, a battery charging system of a general type in which the invention of the present application has a particular application.

What I claim as new and desire to secure by Letters Patent of the United States, is,—

1. In combination in an electric switch, switch contact mechanism operable between a biased position and a second position, an electromagnet having a magnetic movable member which in the attracted position thereof holds said mechanism in said second position, said mechanism being arranged to move to its bias position when said member moves out of its attracted position and a releasing electromagnet having a magnetic movable element which forces said member out of its attracted position.

2. In combination in an electric switch, switch contact mechanism operable between a biased position and a second position, an electromagnet having a magnetic movable member which in its attracted position holds said mechanism in said second position, a releasing electromagnet having a magnetic movable element, and a lever acted upon by said element for forcing said member out of its attracted position to release said contact mechanism to move to the biased position thereof.

3. In combination in an electric switch, switch contact mechanism operable between a biased open position and a closed position, an electromagnet having an armature which in its attracted position holds said contact mechanism in the closed position thereof, a releasing electromagnet having a magnetic movable element, a lever acted upon by said element for forcing said member out of the attracted position thereof, and a winding on said holding electromagnet arranged to be energized simultaneously with the winding of said releasing electromagnet to reduce the holding effect of said holding electromagnet to reduce the magnetic pull of the holding electromagnet at the time the releasing electromagnet is energized, whereby said contact mechanism is quickly released to its biased open position.

4. In combination in an electromagnetic switch, switch contact mechanism operable between a biased position and a second position, an armature for operating said contact mechanism, a holding electromagnet for holding said armature in its attracted position and said contact mechanism in said second position, a lever of non-magnetic material having a fulcrum adjacent said electromagnet for mechanically forcing said armature out of its attracted position to release said contact mechanism to move to its biased position, and an electromagnet having a magnetic movable element which cooperates with the free end of said lever to force said armature out of its attracted position.

5. In combination in an electric switch, switch contact mechanism operable between a biased position and a second position, an electromagnet having a magnetic movable member which in the attracted position thereof holds said mechanism in said second position, a releasing lever associated with said magnetic member, and an operating member for moving said magnetic member to the attracted position and said contact mechanism to said second position, and cooperating with said lever to release said mechanism to move to the biased position thereof by forcing said magnetic member out of its attracted position.

6. In combination in an electric switch, switch contact mechanism operable between a biased position and a second position, an electromagnet having a magnetic movable member connected with said mechanism to hold the same in said second position when said member is in its attracted position, a releasing lever associated with said magnetic member, and a pivoted manual operating member operating in one direction to move said magnetic member to the attracted position and said contact mechanism to said second position and acting on one end of said lever in the return direction to force said magnetic member out of its attracted position to release said contact mechanism to move to the biased position thereof.

7. In combination in an electric switch, switch contact mechanism operable between a biased position and a second position, an electromagnet having a magnetic movable member connected with said mechanism to hold the same in said second position when said member is in its attracted position, a releasing lever associated with said magnetic member, and a pivoted manual operating member operating in one direction to move said magnetic member to the attracted position and said contact mechanism to said second position, and operating on one end of said lever in the return direction to force said magnetic member out of its attracted position to release said contact mechanism to move to the biased position thereof, and a releasing electromagnet having a magnetic movable element arranged to cooperate with said end of said lever to force said magnetic member out of its attracted position.

8. In combination in an electric switch, switch contact mechanism operable between a biased open position and a closed position, an electromagnet having an armature which in its attracted position holds said contact mechanism in the closed position thereof, a releasing electromagnet having a magnetic movable element, a lever acted upon by said element for forcing said armature out of the attracted position thereof, a winding on said holding electromagnet connected in series relation with the winding of said releasing electromagnet to reduce the magnetic pull of the holding electromagnet at the time the releasing magnet is energized, whereby said contact mechanism is quickly released to its biased open position, and a pivoted manual operating member operating in one direction to move said armature to the attracted position and said contact mechanism to said second position, and operating on one end of said lever in the returned direction to force said armature out of its attracted position to release said contact mechanism to move to the biased position thereof.

In witness whereof, I have hereunto set my hand this 9th day of September, 1926.

LESLIE W. BOND.